US008805021B2

United States Patent
Hwang et al.

(10) Patent No.: US 8,805,021 B2
(45) Date of Patent: Aug. 12, 2014

(54) METHOD AND APPARATUS FOR ESTIMATING FACE POSITION IN 3 DIMENSIONS

(75) Inventors: Won Jun Hwang, Suwon-si (KR); Ji Hyo Lee, Yongin-si (KR); Kyung Shik Roh, Seongnam-si (KR); Suk June Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 13/218,850

(22) Filed: Aug. 26, 2011

(65) Prior Publication Data

US 2012/0121126 A1 May 17, 2012

(30) Foreign Application Priority Data

Nov. 17, 2010 (KR) ........................ 10-2010-0114462

(51) Int. Cl.
*G06K 9/00* (2006.01)

(52) U.S. Cl.
USPC .......................................... 382/106; 382/118

(58) Field of Classification Search
CPC .......... H04N 13/0003; H04N 5/23219; H04N 13/00; G06K 9/00268; G06K 9/00664; G06K 9/00201; G06K 9/00221–9/00315; G06K 2209/00221; G06K 2209/40–2209/403
USPC ........................... 382/106, 115, 118, 153, 154
See application file for complete search history.

(56) References Cited

U.S. PATENT DOCUMENTS

| 6,201,883 | B1* | 3/2001 | Mizui | 382/109 |
| 6,820,897 | B2* | 11/2004 | Breed et al. | 280/735 |
| 6,963,657 | B1* | 11/2005 | Nishigaki et al. | 382/106 |
| 7,593,552 | B2* | 9/2009 | Higaki et al. | 382/118 |
| 8,406,484 | B2* | 3/2013 | Yoon et al. | 382/118 |
| 2005/0216124 | A1* | 9/2005 | Suzuki | 700/253 |
| 2008/0232651 | A1* | 9/2008 | Woo | 382/118 |
| 2011/0102553 | A1* | 5/2011 | Corcoran et al. | 348/50 |
| 2011/0164141 | A1* | 7/2011 | Tico et al. | 348/207.99 |

FOREIGN PATENT DOCUMENTS

JP         2007178543 A   *   7/2007

* cited by examiner

*Primary Examiner* — Shefali Goradia
(74) *Attorney, Agent, or Firm* — Staas & Halsey LLP

(57) ABSTRACT

An apparatus and method for estimating a three-dimensional face position. The method of estimating the three-dimensional face position includes acquiring two-dimensional image information from a single camera, detecting a face region of a user from the two-dimensional image information, calculating the size of the detected face region, estimating a distance between the single camera and the user's face using the calculated size of the face region, and obtaining positional information of the user's face in a three-dimensional coordinate system using the estimated distance between the single camera and the user's face. Accordingly, it is possible to estimate the distance between the user and the single camera using the size of the face region of the user in the image information acquired by the single camera so as to acquire the three-dimensional position coordinates of the user.

22 Claims, 9 Drawing Sheets

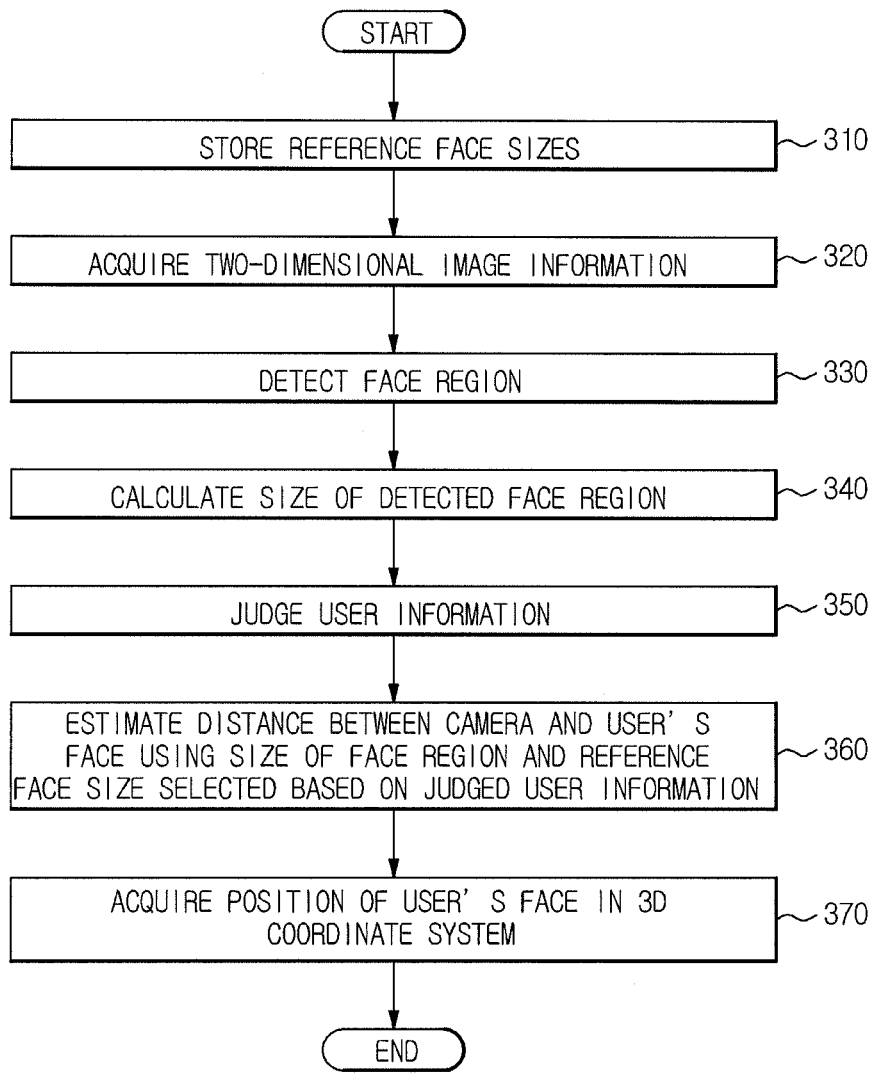

METHOD AND APPARATUS FOR ESTIMATING FACE POSITION IN 3 DIMENSIONS

CROSS-REFERENCE TO RELATED APPLICATIONS

This application claims the benefit of Korean Patent Application No. 2010-114462, filed on Nov. 17, 2010 in the Korean Intellectual Property Office, the disclosure of which is incorporated herein by reference.

BACKGROUND

1. Field

Embodiments relate to a method and apparatus for estimating a face position in three dimensions using a vision system such as a camera.

2. Description of the Related Art

A robot or a machine may perform various functions by detecting position of a user in three dimensions (3D). In particular, as an example, accurate positional information of a user is necessary in a call & come system for enabling a robot to approach the user when the user issues a command to the robot. As an additional example, accurate positional information of a user is necessary in an air conditioner system that detects the position of a user and optimizes services provided thereby in terms of fan power and direction.

Accordingly, in order to estimate the position of a user in 3D, in the related art, the depth of the user is estimated using a stereo vision/multi-camera or a system based on an infrared ray (IR) sensor such as a time of flight (TOF) sensor is used. In addition, a method of measuring a distance from a user using a laser sensor is used.

However, in the IR sensor such as the TOF sensor, since a result value is distorted by external light, such as sunlight, the IR sensor such as the TOF sensor is not well suited to outdoor use. The laser sensor may damage the sight of the user.

In addition, the stereo vision/multi-camera system requires a plurality of cameras. In the system using the TOF sensor or the laser sensor, the sensor is expensive. Thus, these systems are problematic in terms of costs.

SUMMARY

Therefore, it is an aspect of an embodiment to provide a method and apparatus for estimating a face position in three dimensions, which is capable of calculating the size of a face region of a user from two-dimensional image information acquired from a single camera, estimating a distance between the single camera and the user using the calculated size of the face region, and detecting the position of the user in a 3D coordinate system.

Additional aspects of embodiments will be set forth in part in the description which follows and, in part, will be obvious from the description, or may be learned by practice of the embodiments.

In accordance with an aspect of an embodiment, there is provided a method of estimating a three-dimensional face position including acquiring two-dimensional image information from a single camera, detecting a face region of a user from the two-dimensional image information, calculating the size of the detected face region, estimating a distance between the single camera and the user's face using the calculated size of the face region, and obtaining positional information of the user's face in a three-dimensional coordinate system using the estimated distance between the single camera and the user's face.

The obtaining of the positional information of the user's face in the three-dimensional coordinate system may include calculating a central position of the detected face region in an image coordinate system, and converting the central position of the face region in the image coordinate system into a position in the three-dimensional coordinate system using the distance between the single camera and the user and camera specifications including field of view (FOV) and resolution of the single camera.

The converting of the central position of the face region in the image coordinate system into the position in the three-dimensional coordinate system may include calculating an angle of projection of the central position of the face region onto a coordinate axis of the image coordinate system based upon the camera specifications, and converting the central position of the face region in the image coordinate system into the position in the three-dimensional coordinate system using the calculated angle of projection and the distance between the single camera and the user's face.

The size of the face region may be a diagonal distance of the detected face region.

The detecting of the face region may be performed using Ada-Boost face recognition.

In accordance with another aspect of an embodiment, there is provided a method of estimating a three-dimensional face position including storing reference face sizes according to user information including age, sex and race information of a user in advance, acquiring two-dimensional image information from a single camera, detecting a face region of a user from the two-dimensional image information, calculating the size of the detected face region, judging the user information in the detected face region and selecting a reference face size corresponding to the judged user information from the reference face sizes, estimating a distance between the single camera and the user's face using the calculated size of the face region and the selected reference face size, and obtaining positional information of the user's face in a three-dimensional coordinate system using the estimated distance between the single camera and the user's face.

The obtaining of the positional information of the user's face in the three-dimensional coordinate system may include calculating a central position of the detected face region in a two-dimensional image coordinate system, and converting the central position of the face region in the image coordinate system into a position in the three-dimensional coordinate system using the distance between the single camera and the user and camera specifications including field of view (FOV) and resolution of the single camera.

The converting of the central position of the face region in the image coordinate system into the position in the three-dimensional coordinate system may include calculating an angle of projection of the central position of the face region onto a coordinate axis of the image coordinate system based upon the camera specifications, and converting the central position of the face region in the image coordinate system into the position in the three-dimensional coordinate system using the calculated angle of projection and the distance between the single camera and the user's face.

The size of the face region may be a diagonal distance of the detected face region.

The detecting of the face region may be performed using Ada-Boost face recognition.

In accordance with another aspect of an embodiment, there is provided an apparatus for estimating a three-dimensional face position including a camera unit including a single camera configured to acquire two-dimensional image information, a face extraction unit configured to detect a face region of a user from the two-dimensional image information acquired by the camera unit, a face size calculation unit configured to calculate the size of the face region detected by the face extraction unit, a distance estimation unit configured to estimate a distance between the single camera and the user's face using the size of the face region calculated by the face size calculation unit, and a three-dimensional position acquisition unit configured to obtain positional information of the user's face in a three-dimensional coordinate system using the distance between the camera unit and the user's face estimated by the distance estimation unit.

The three-dimensional position acquisition unit may calculate a central position of the detected face region in an image coordinate system, and convert the calculated central position of the face region into a position in the three-dimensional coordinate system using the distance between the camera unit and the user and camera specifications including field of view (FOV) and resolution of the camera unit.

The three-dimensional position acquisition unit may calculate an angle of projection of the central position of the face region onto a coordinate axis of the image coordinate system based upon the camera specifications, and convert the central position of the face region into the position in the three-dimensional coordinate system using the calculated angle of projection and the distance between the camera unit and the user's face.

The face size calculation unit may calculate a diagonal distance of the face region detected by the face extraction unit to be used as the size of the face region.

The face extraction unit may detect the face region using Ada-Boost face recognition.

The apparatus may further include a memory unit configured to store reference face sizes according to user information including age, sex and race information in advance, and a user information judgment unit configured to judge the user information using the face region detected by the face extraction unit, and the distance estimation unit may select a reference face size corresponding to the user information judged by the user information judgment unit from the reference face sizes stored in the memory unit, and estimate the distance between the camera unit and the user's face using the selected reference face size and the calculated size of the face region calculated by the face size calculation unit.

BRIEF DESCRIPTION OF THE DRAWINGS

These and/or other aspects of embodiments will become apparent and more readily appreciated from the following description of the embodiments, taken in conjunction with the accompanying drawings of which:

FIG. 9 is a flowchart illustrating a method for estimating a 3D face position according to another embodiment.

DETAILED DESCRIPTION

Figure 1:
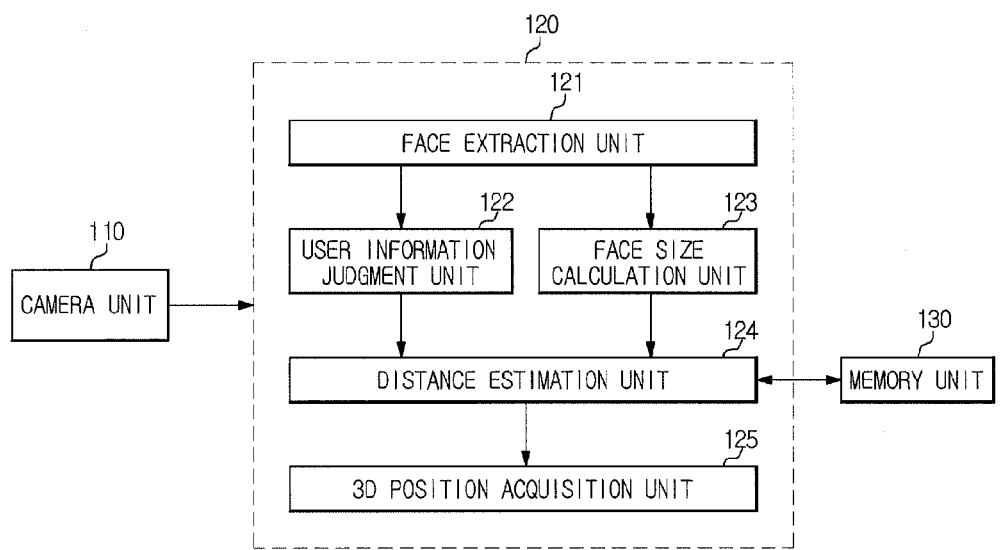
FIG. 1 is a block diagram showing an apparatus for estimating a face position in three dimensions (3D) according to an embodiment.

Reference will now be made in detail to embodiments, examples of which are illustrated in the accompanying drawings, wherein like reference numerals refer to like elements throughout.

Figure 2:
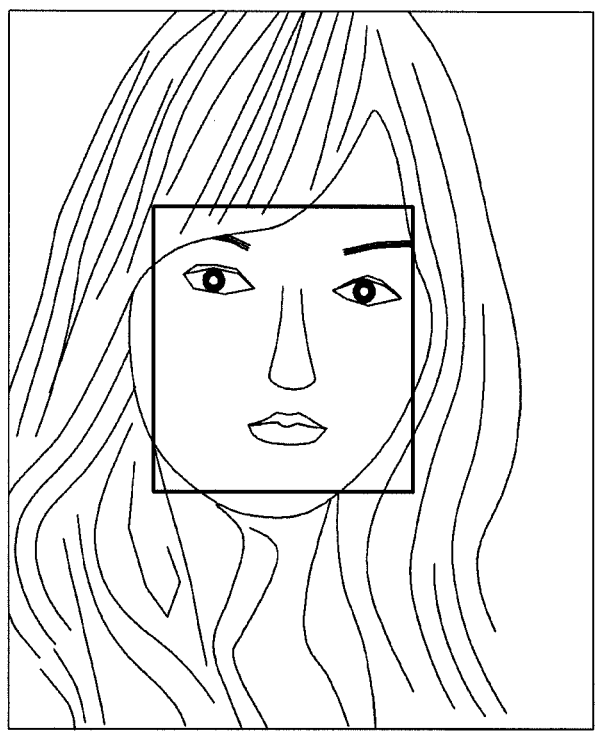
FIG. 2 is a diagram showing a state of extracting a user's face by a face extraction unit shown in FIG. 1.
Figure 3:
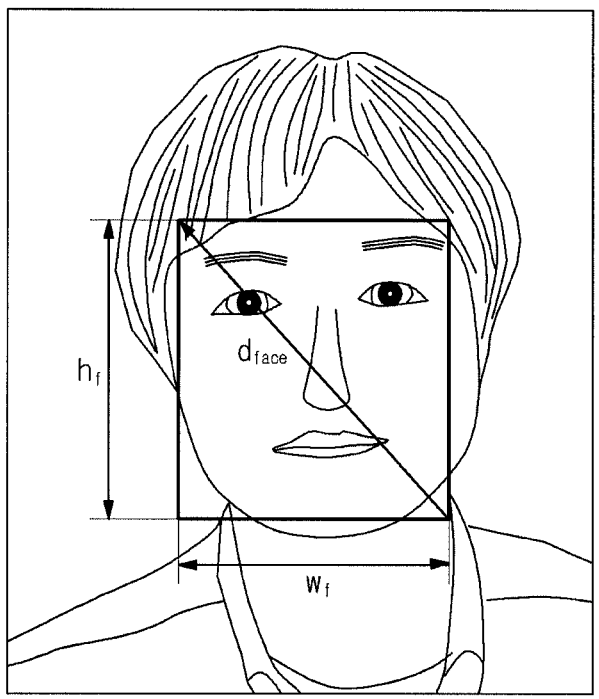
FIG. 3 is a diagram showing a state of calculating the size of a user's face by a face size calculation unit shown in FIG. 1.
Figure 4:
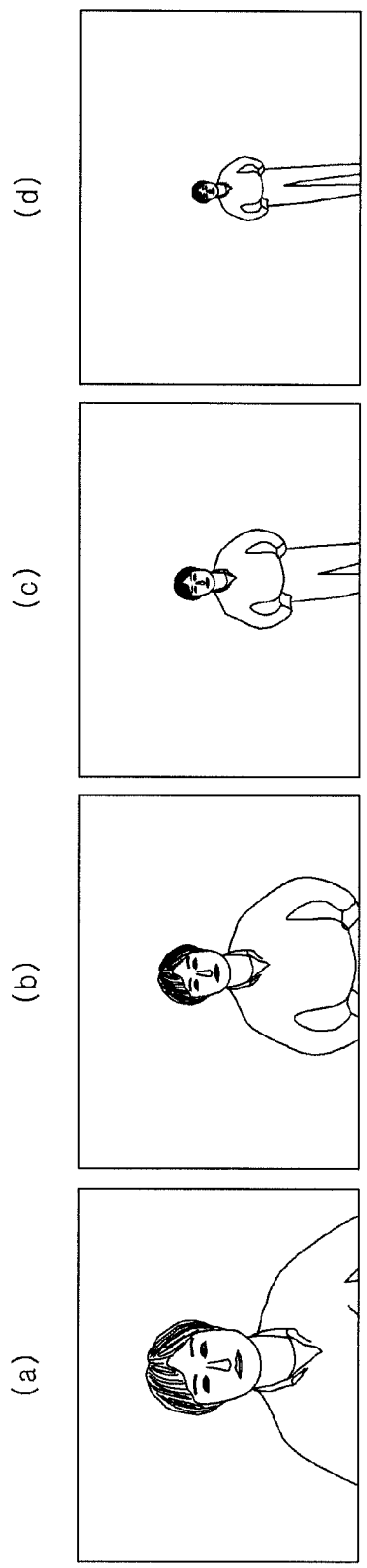
FIG. 4 is a diagram illustrating the principle of estimating a distance between a camera and a user from the size of the user's face by a distance estimation unit shown in FIG. 1.

FIG. 1 is a block diagram showing an apparatus for estimating a face position in three dimensions (3D) according to an embodiment, FIG. 2 is a diagram showing a state of extracting a user's face by a face extraction unit shown in FIG. 1, FIG. 3 is a diagram showing a state of calculating the size of a user's face by a face size calculation unit shown in FIG. 1, and FIG. 4 is a diagram illustrating the principle of estimating a distance between a camera and a user from the size of the user's face by a distance estimation unit shown in FIG. 1.

The apparatus for estimating the 3D face position according to an embodiment includes a camera unit 110, a control unit 120 and a memory unit 130.

The camera unit 110 acquires an image of a subject and provides the image to the control unit 120.

Specifically, the camera unit 110 acquires the two-dimensional image of the subject using light. Light is focused by a focusing unit (not shown), the focused light is captured by an imaging unit (image sensor: CMOS or CCD) (not shown), the light captured by the imaging unit is converted into an electrical signal, and the image of the converted electrical signal is stored as an image file having two-dimensional image information.

In particular, the camera unit 110 of the present embodiment is a single camera which acquires the image of a user (i.e., a subject), stores the image as an image file, and transmits the stored image file to the control unit 120.

The control unit 120 calculates 3D position information of the user using the image information transmitted from the camera unit 110 and includes a face extraction unit 121, a face size calculation unit 122, a user information judgment unit 123, a distance estimation unit 124 and a three-dimensional positional information acquisition unit 125.

The face extraction unit 121 detects a face region from the two-dimensional image information transmitted from the camera unit 110.

The face extraction unit 121 is an Ada-Boost face recognition detector based upon the principle that, when a learned face is in a predetermined region, a detected face is restricted to the predetermined region.

In particular, in the face extraction unit 121 of the present embodiment, a portion from the eyebrows to the lips is set as the predetermined region of the learned face, as shown in FIG. 2. If the predetermined region of the face is set, the face extraction unit detects a rectangular portion (denoted by a dotted line) corresponding to the predetermined region from the two-dimensional image information and transmits the detected face region to the face size calculation unit 122 and the user information judgment unit 123.

The face size calculation unit 122 calculates the size of the face region detected by the face extraction unit 121.

Specifically, referring to FIG. 3, the face size calculation unit 122 calculates the diagonal length $d_{face}$ of the face region, obtains the size of the face, and transmits the size of the face to the distance estimation unit 124.

The user information judgment unit 123 judges user information such as sex, age and race of the user based on the detected face region. The judged user information is transmitted to the distance estimation unit 124 and is used to estimate the distance between the user and the camera 110.

The distance estimation unit 124 estimates the distance between the user's face and the camera unit 110 based on the size of the face calculated by the face size calculation unit 122.

Referring to FIG. 4, it can be seen that, as the distance between the user and the camera increases, the size of the face region of the user is decreased.

The distance estimation unit 124 of the present embodiment estimates the distance between the user and the camera unit 110 based upon the principle that the size of the detected face region is inversely proportional to the distance from the camera unit 110.

The equation for estimating the distance between the user and the camera unit 110 of the distance estimation unit 124 is expressed by Equation 1.

$$D_c = K/d_{face} \qquad \text{Equation 1}$$

$D_c$ denotes the distance between the user and the camera unit 110, $d_{face}$ denotes the size of the user's face calculated by the face size calculation unit 122, and K is a constant which is an experimental value based on the hardware specifications of the camera.

The distance estimation unit 124 calculates the distance between the user and the camera unit 110 using the size of the face acquired from the two-dimensional image information on the assumption that the sizes of the user's faces are similar.

However, since the sizes of the user's faces are different, errors may occur in the calculation of the distance between the user and the camera. Accordingly, the distance estimation unit 124 corrects the value K based on a reference face size table including average user face size information according to sex, age and race of the user, which is stored in the memory unit 130, and the user information judged by the user information judgment unit.

That is, the distance estimation unit 124 corrects the estimated distance using the reference face size corresponding to the user information judged by the user information judgment unit 123. Thus, it is possible to more accurately calculate the distance between the user and the camera.

The 3D position information acquisition unit 125 acquires the 3D position information of the user based on the distance between the user and the camera estimated by the distance estimation unit 124.

Specifically, the 3D position information acquisition unit 125 obtains a central position $(p_x, p_y)$ of the detected face region in an image coordinate system.

If the central position of the face region in the image coordinate system is calculated, the 3D position information acquisition unit 125 converts the central position $(p_x, p_y)$ in the image coordinate system into a position $(P_x, P_y, P_z)$ in a 3D coordinate system using the calculated distance $D_c$ between the user and the camera and the hardware specifications of the camera.

The position $(P_x, P_y, P_z)$ on the 3D coordinate system becomes the 3D position information of the user.

The memory unit 130 stores the hardware specifications value of the camera including a field of view (FOV) of the camera of the camera unit 110 and camera resolution. The memory unit 130 stores the reference user face size table including the average face sizes according to the sex, age and race of the user.

Figure 5:
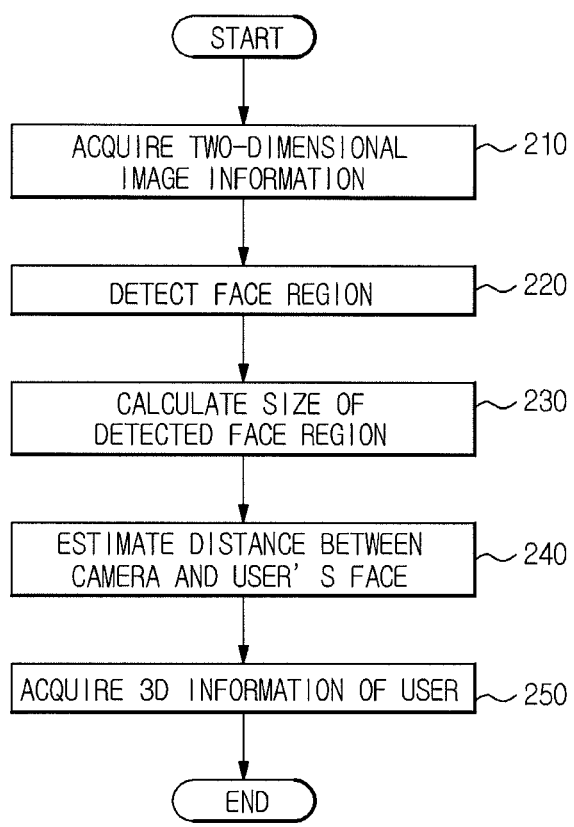
FIG. 5 is a flowchart illustrating a method for estimating a 3D face position according to another embodiment.

FIG. 5 is a flowchart illustrating a method for estimating a 3D face position according to another embodiment.

First, the two-dimensional image information of the user is acquired using the camera unit (210). The camera unit is a single camera and may be at least one of a digital camera, a CCD, a CMOS camera, and a webcam.

If the two-dimensional image information of the user is acquired (210), the face extraction unit detects the face region of the user (220).

The face extraction unit detects the predetermined region of the user's face using the Ada-Boost method.

The face extraction unit of the present embodiment sets the portion from the eyebrows to the lips as the predetermined region and detects the rectangular portion corresponding to the predetermined region from the two-dimensional image information.

Once the face region of the user is detected (220), the size of the detected face region is calculated by the face size calculation unit (230). In the present embodiment, the size of the face region is set to the diagonal length of the rectangular face region.

That is, the face size calculation unit calculates the diagonal length $d_{face}$ using the width $w_f$ and the height $h_f$ of the face region as expressed by Equation 2.

$$d_{face} = \sqrt{w_f^2 + h_f^2} \qquad \text{Equation 2}$$

If the size of the face region is calculated by the face size calculation unit (230), the distance estimation unit estimates the distance of the user's face and the camera using the calculated size of the face region (240).

The distance estimation unit estimates the distance based upon the principle that, as the distance between the user and the camera increases, the size of the face region in the captured image is decreased.

If the distance between the user and the camera is estimated (240), the 3D position information acquisition unit acquires the 3D position information of the user in a 3D coordinate system (250).

Specifically, the 3D position information acquisition unit obtains the central position of the user's face in the two-dimensional image coordinate system and converts the central position of the face into the position on the 3D coordinate system.

According to the present embodiment, since the 3D position of the user is calculated using the size of the face region of the user from the image information acquired by the single camera, it is possible to reduce costs, as compared to the related art using a plurality of cameras or a special sensor.

Figure 6:
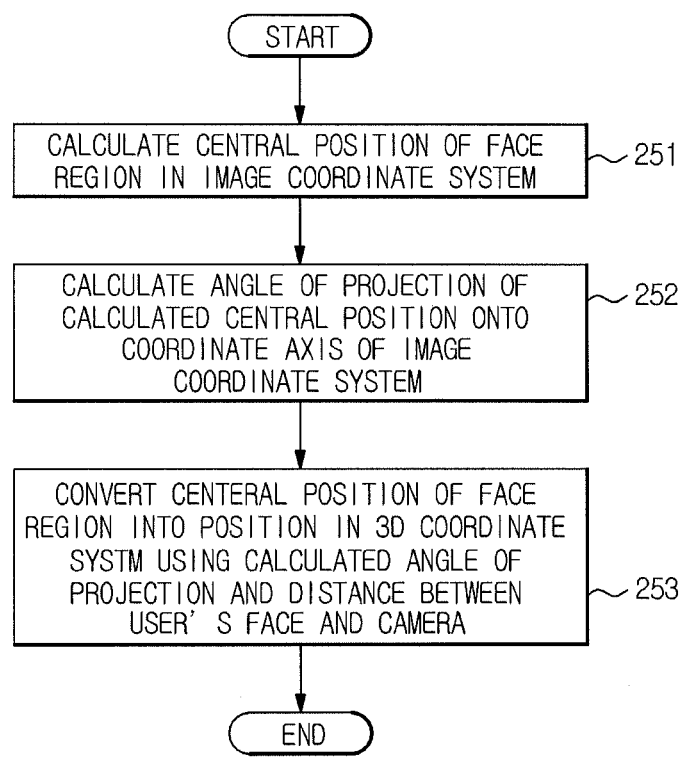
FIG. 6 is a flowchart illustrating a process of acquiring the 3D position of the user shown in FIG. 5 in detail.
Figure 7:
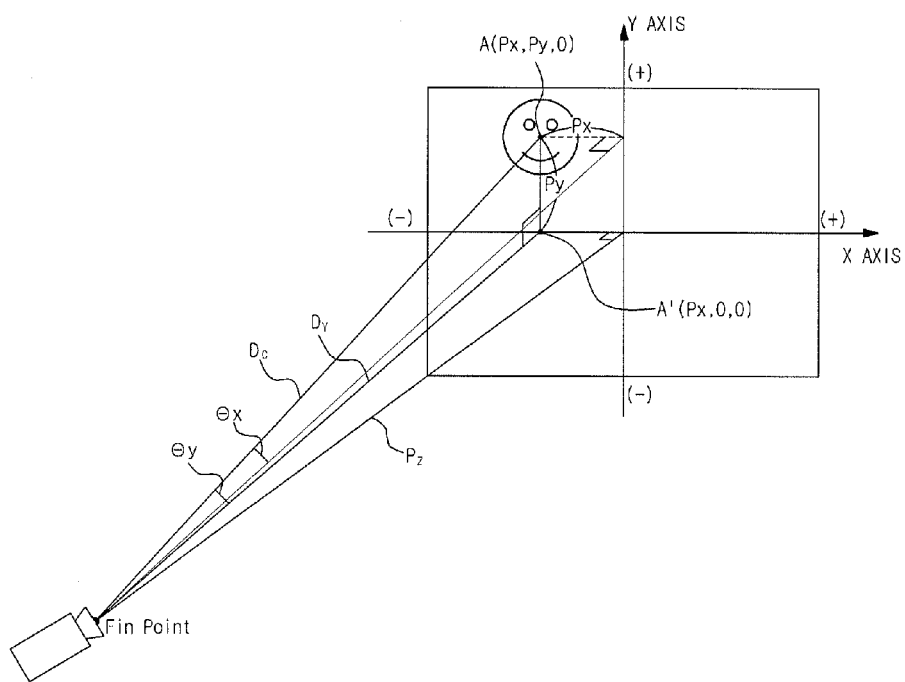
FIG. 7 is a diagram illustrating a positional relationship between a user and a camera.
Figure 8:
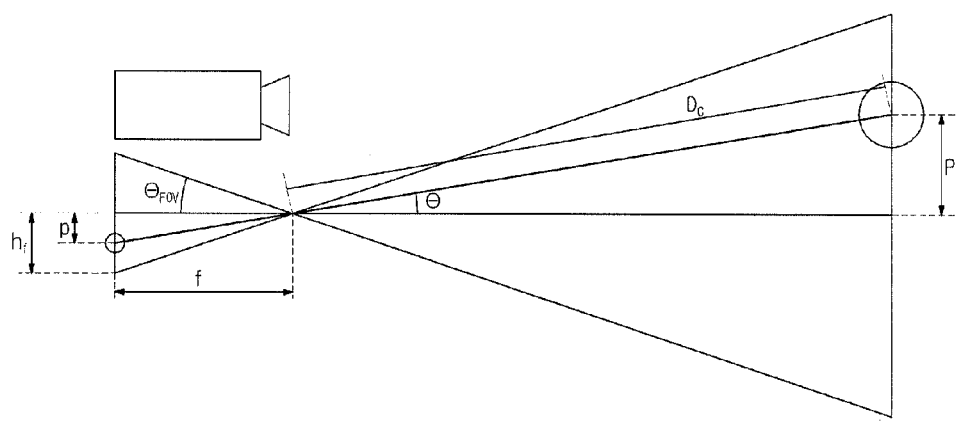
FIG. 8 is a diagram illustrating a positional relationship between a user, a camera and an image.

FIG. 6 is a flowchart illustrating a process of acquiring the 3D position coordinates of the user shown in FIG. 5 in detail, FIG. 7 is a diagram illustrating a positional relationship between a user and a camera, and FIG. 8 is a diagram illustrating a positional relationship between a user, a camera and an image.

First, the central position of the detected face region is calculated in the image coordinate system (251). The image coordinate system is a two-dimensional coordinate system and the center (0, 0) matches a pinpoint of the camera.

If the two-dimensional central position of the face region is calculated (251), the two-dimensional central position is converted into a position on the 3D coordinate system using the calculated distance between the user's face and the camera and the hardware specifications of the camera (252 and 253).

Referring to FIG. 7, in the present embodiment, the position ($P_x$, $P_y$, $P_z$) of the user in the three-dimensional coordinate system is calculated.

In the present embodiment, the user's face in the 3D coordinate system is projected onto the XY plane and the central position A($P_x$, $P_y$, 0) of the user's face projected onto the XY plane is projected onto the X axis and the Y axis, in order to obtain the three-dimensional position parallel to the X axis and the Y axis.

Specifically, on the Y axis, a right triangle is formed by the pinpoint of the camera, A($P_x$, $P_y$, 0) and A'($P_x$, 0, 0). The distance $D_c$ between the camera and the user's face calculated by the distance estimation unit is the hypotenuse of the right triangle.

The position $P_y$ of the user's face parallel to the y axis in the three-dimensional coordinate system may be calculated using the distance $D_c$ between the camera and the user's face calculated by the distance estimation unit and an angle $\theta_y$ of projection of the three-dimensional central position A($P_x$, $P_y$, 0) of the user's face onto the x axis by Equation 3.

$$P_y = D_c \sin(\theta_y) \quad \text{Equation 3}$$

In addition, the position $P_x$ of the user's face parallel to the x axis in the three-dimensional coordinate system may be calculated using the distance $D_c$ between the camera and the user's face calculated by the distance estimation unit and an angle $\theta_x$ of projection of the three-dimensional central position A($P_x$, $P_y$, 0) of the user's face onto the y axis by Equation 3.

The position $P_z$ of the user's face parallel to the z axis is the calculated position parallel to the X axis and the Y axis and may be calculated as follows. First, a right triangle formed by the pinpoint of the camera, A'($P_x$, 0, 0) and the origin (0, 0, 0) in the 3D coordinate system, and the distance $D_y$ from the pinpoint of the camera to A'($P_x$, 0, 0) is the hypotenuse of the right triangle.

The position $P_z$ of the user's face parallel to the Z axis is calculated by Equation 4 using the formed right triangle.

$$P_z = Z = \sqrt{D_Y^2 - P_X^2} \quad \text{Equation 4}$$

As described above, in order to calculate the three-dimensional position of the user's face, the angle ($\theta_x$, $\theta_y$) of projection onto the X axis and the Y axis needs to be obtained. The method of calculating the angle of projection will be described with reference to FIG. 8.

FIG. 8 is a diagram illustrating a positional relationship between a user, a camera and an image. The angle of projection onto the X axis and the Y axis of the 3D coordinate system matches an angle of the two-dimensional central position ($p_x$, $p_y$) of the user's face in the image coordinate system.

That is, the angle $\theta$ of projection of the central position p of the user's face in the image coordinate system onto the coordinate axis of the image coordinate system matches the angle $\theta$ of projection onto the 3D coordinate system.

Specifically, the angle $\theta$ of projection of the three-dimensional position P of the user's face onto the x axis matches the angle $\theta$ of projection of the central position p of the user's face within the image onto the x axis of the image coordinate system, and the angle $\theta$ of projection of the three-dimensional position P of the user's face onto the y axis matches the angle $\theta$ of projection of the central position p of the user's face within the image onto the y axis of the image coordinate system.

The angle of projection is calculated using such a principle and the equation for calculating the angle of projection is expressed by Equation 5.

$$\tan \theta = p/f \quad \text{Equation 5}$$

$\theta$ denotes the angle of projection, p denotes the central position of the user's face in the image coordinate system, and f denotes a distance (focal length) from the camera lens to a point where the image of the user's face is formed.

The focal length is calculated based upon the hardware specifications of the camera, and the hardware specifications include FOV and resolution.

Referring to FIG. 8, f may be estimated using the FOV $\theta_{FOV}$ and the resolution $h_f$ of the camera. The method of estimating f is expressed by Equation 6

$$\tan \theta_{FOV} = h_f / f$$

$$f = h_f / \tan \theta_{FOV} \quad \text{Equation 6}$$

If the focal length f is obtained by Equation 6, the focal length is substituted into Equation 5 such that the angle of projection onto each axis is calculated as expressed by Equation 7.

$$\theta = \tan^{-1}(p*(\tan \theta_{FOV}/h_f)) \quad \text{Equation 7}$$

Up to now, the method of calculating the positional information of the user's face in the three-dimensional coordinate system has been described. Since the positional information of the user's face may provide information indicating how far the user is from a robot in a Human Robot Interaction (HRI) system, it is possible to assist robot walking. In an air conditioner system, it is possible to optimize services based on the calculated positional information of the user's face.

The positional information of the user's face is calculated based on the size of the user's face captured by the camera. However, since face size varies according to sex, age and race, errors may occur.

Accordingly, another embodiment of judging user information including the sex, age and race of the user from the captured image and more accurately calculating the positional information of the user's face based on the judged user information will be described with reference to FIG. 9.

FIG. 9 is a flowchart illustrating a method of estimating a 3D face position according to another embodiment.

First, average face sizes are set according to the sex, age and race as reference face sizes and are stored in the memory unit in the form of a table (310).

The two-dimensional image information of the user is acquired using the camera (320) and the face extraction unit detects the face region of the user (330).

The face extraction unit detects the predetermined region of the user's face using Ada-Boost face recognition. In the present embodiment, the portion from the eyebrows to the lips is set as the predetermined region.

If the face region of the user is detected (330), the face size calculation unit calculates the size of the face region (340). In the present embodiment, the size of the face region is set to the diagonal length of the detected face region.

The user information judgment unit judges the user information based on the face region of the user (350). Specifically, the user information judgment unit judges information about the sex, age and race of the user and provides the information to the distance estimation unit.

The distance estimation unit estimates the distance between the user's face and the camera based on the user information judged by the user information judgment unit and the size of the face region calculated by the face size calculation unit (360).

The distance estimation unit estimates the distance based upon the principle that, as the distance between the user and the camera increases, the size of the face region in the captured image decreases, and estimates the distance using the user information.

Specifically, the distance estimation unit estimates the distance using an inversely proportional relationship between the size of the face region and the distance between the camera and the user.

For example, if the user information judged by the user information judgment unit is an adult male, the distance estimation unit more accurately estimates the distance between the camera and the user using the reference face size for an adult male stored in the memory.

If the distance between the camera and the user is estimated, the 3D position information acquisition unit obtains the 3D position information of the user's face in the 3D coordinate system based on the distance (370).

In the apparatus and method for estimating the 3D face position according to an embodiment, it is possible to estimate the distance between the user and the single camera using the size of the face region of the user in the image information acquired by the single camera so as to acquire the three-dimensional position coordinates of the user.

In an HRI system in which a robot approaches a user when the user issues a command to the robot, since it is possible to check how far the robot is from the user, it is possible to assist robot walking.

In an air conditioner system, since it is possible to provide optimal wind power and an optimal wind direction or simply adjust wind power and wind direction based on the 3D position of the user, it is possible to prevent power consumption and to provide optimal services to the user.

Since the 3D position coordinates of the user are estimated using the single camera, it is possible to reduce costs, as compared to the related art using a plurality of cameras or a special sensor.

Embodiments relate to detecting a face region of a subject. The subject can be, for example, the user of an apparatus. As an example, as described herein, the apparatus may be a robot or an air conditioner system. However, the apparatus is not limited to being a robot or an air conditioner system, and can be other types of apparatuses.

If the subject is a user of an apparatus, the camera may be positioned on the apparatus. For example, if the apparatus is a robot, the camera may be positioned on the robot and, for example, may move with the robot. However, the camera is not limited to being positioned on the apparatus. As an example, if the subject is a user of an apparatus and the positioning of the camera with respect to the apparatus is known, then the camera may be positioned remotely from the apparatus.

Moreover, the subject is not limited to being the user of an apparatus. Instead, embodiments may be used to simply obtain positional information of a subject in a three-dimensional coordinate system using the estimated distance between the single camera and the face of the subject as described herein.

Embodiments can be implemented in computing hardware and/or software, such as (in a non-limiting example) any computer that can store, retrieve, process and/or output data and/or communicate with other computers. For example, various calculations and/or operations described herein can be performed by a computer. For example, the control unit 120 in FIG. 1 may include a computer to perform various calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.).

Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method comprising:
acquiring two-dimensional image information from a single camera, the two-dimensional image information including a face of a subject;
detecting a face region of the subject from the two-dimensional image information;
calculating, by a computer, a size of the detected face region;
estimating, by a computer, a distance between the single camera and the face of the subject using the calculated size of the face region; and
obtaining, by a computer, positional information of the face of the subject in a three-dimensional coordinate system using the estimated distance between the single camera and the face of the subject,
wherein the obtaining of the positional information of the face of the subject in the three-dimensional coordinate system includes:
calculating a central position of the detected face region in an image coordinate system; and
converting the central position of the face region in the image coordinate system into a position in the three-dimensional coordinate system using the estimated distance between the single camera and the face of the subject and camera specifications including field of view (FOV) and resolution of the single camera.

2. The method according to claim 1, wherein the converting of the central position of the face region in the image coordinate system into the position in the three-dimensional coordinate system includes:
calculating an angle of projection of the central position of the face region onto a coordinate axis of the image coordinate system based upon the camera specifications; and
converting the central position of the face region in the image coordinate system into the position in the three-dimensional coordinate system using the calculated angle of projection and the estimated distance between the single camera and the face of the subject.

3. The method according to claim 1, wherein the size of the face region is a diagonal distance of the detected face region.

4. The method according to claim 1, wherein the detecting of the face region is performed using Ada-Boost face recognition.

5. The method according to claim 1, wherein the subject is a user of an apparatus.

6. The method according to claim 5, wherein the apparatus is a robot, and the camera is positioned on the robot.

7. The method according to claim 5, wherein the apparatus is an air conditioner system which adjusts services provided by the air conditioner system based on the obtained positional information.

8. A method comprising:
storing reference face sizes according to subject information including age, sex and race information in advance;

acquiring two-dimensional image information from a single camera, the two-dimensional image information including a face of a subject;

detecting a face region of the subject from the two-dimensional image information;

calculating, by a computer, a size of the detected face region;

judging, by a computer, the subject information in the detected face region and selecting a reference face size corresponding to the judged subject information from the reference face sizes;

estimating, by a computer, a distance between the single camera and the face of the subject using the calculated size of the face region and the selected reference face size; and obtaining, by a computer, positional information of the face of the subject in a three-dimensional coordinate system using the estimated distance between the single camera and the face of the subject, wherein the obtaining of the positional information of the face of the subject in the three-dimensional coordinate system includes:

calculating a central position of the detected face region in a two-dimensional image coordinate system; and converting the central position of the face region in the image coordinate system into a position in the three-dimensional coordinate system using the estimated distance between the single camera and the face of the subject and camera specifications including field of view (FOV) and resolution of the single camera.

9. The method according to claim 8, wherein the converting of the central position of the face region in the image coordinate system into the position in the three-dimensional coordinate system includes:

calculating an angle of projection of the central position of the face region onto a coordinate axis of the image coordinate system based upon the camera specifications; and converting the central position of the face region in the image coordinate system into the position in the three-dimensional coordinate system using the calculated angle of projection and the estimated distance between the single camera and the face of the subject.

10. The method according to claim 8, wherein the size of the face region is a diagonal distance of the detected face region.

11. The method according to claim 8, wherein the detecting of the face region is performed using Ada-Boost face recognition.

12. The method according to claim 8, wherein the subject is a user of an apparatus.

13. The method according to claim 12, wherein the apparatus is a robot, and the camera is positioned on the robot.

14. The method according to claim 12, wherein the apparatus is an air conditioner system which adjusts services provided by the air conditioner system based on the obtained positional information.

15. An apparatus comprising:

a camera including a single camera configured to acquire two-dimensional image information, the two-dimensional image information including a face of a subject;

a face extractor configured to detect a face region of the subject from the two-dimensional image information acquired by the camera;

a face size calculator configured to calculate a size of the face region detected by the face extractor;

a distance estimator configured to estimate a distance between the single camera and the face of the subject using the size of the face region calculated by the face size calculator; and a three-dimensional position calculator configured to obtain positional information of the face of the subject in a three-dimensional coordinate system using the distance between the camera and the face of the subject estimated by the distance estimator, wherein the three-dimensional position calculator calculates a central position of the detected face region in an image coordinate system, and converts the calculated central position of the face region into a position in the three-dimensional coordinate system using the estimated distance between the camera and the face of the subject and camera specifications including field of view (FOV) and resolution of the camera.

16. The apparatus according to claim 15, wherein the three-dimensional position calculator calculates an angle of projection of the central position of the face region onto a coordinate axis of the image coordinate system based upon the camera specifications, and converts the central position of the face region into the position in the three-dimensional coordinate system using the calculated angle of projection and the estimated distance between the camera and the face of the subject.

17. The apparatus according to claim 15, wherein the face size calculator calculates a diagonal distance of the face region detected by the face extractor to be used as the size of the face region.

18. The apparatus according to claim 15, wherein the face extractor detects the face region using Ada-Boost face recognition.

19. The apparatus according to claim 17, further comprising:

a memory configured to store reference face sizes according to subject information including age, sex and race information in advance; and an information judgment calculator configured to judge the subject information using the face region detected by the face extractor, wherein the distance estimator selects a reference face size corresponding to the subject information judged by the information judgment calculator from the reference face sizes stored in the memory, and estimates the distance between the camera and the face of the subject using the selected reference face size and the calculated size of the face region calculated by the face size calculator.

20. The apparatus according to claim 15, wherein the subject is a user of the apparatus.

21. The apparatus according to claim 20, wherein the apparatus is a robot.

22. The apparatus according to claim 20, wherein the apparatus is an air conditioner system which adjusts services provided by the air conditioner system based on the obtained positional information.

* * * * *

UNITED STATES PATENT AND TRADEMARK OFFICE
CERTIFICATE OF CORRECTION

| | | |
|---|---|---|
| PATENT NO. | : 8,805,021 B2 | Page 1 of 1 |
| APPLICATION NO. | : 13/218850 | |
| DATED | : August 12, 2014 | |
| INVENTOR(S) | : Won Jun Hwang et al. | |

It is certified that error appears in the above-identified patent and that said Letters Patent is hereby corrected as shown below:

In the Claims

Column 12, line 39, in Claim 19, delete "claim 17," and insert -- claim 15, --, therefor.

Signed and Sealed this
Nineteenth Day of May, 2015

Michelle K. Lee
*Director of the United States Patent and Trademark Office*